(12) United States Patent
Fink

(10) Patent No.: US 9,368,978 B2
(45) Date of Patent: Jun. 14, 2016

(54) TIME-CONTROLLED CHARGE BALANCING IN BATTERY SYSTEMS

(71) Applicants: Robert Bosch GmbH, Stuttgart (DE); Samsung SDI Co., Ltd., Yongin-si, Gyeonggi-do (KR)

(72) Inventor: Holger Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 140 days.

(21) Appl. No.: 14/255,553

(22) Filed: Apr. 17, 2014

(65) Prior Publication Data

US 2014/0312846 A1 Oct. 23, 2014

(30) Foreign Application Priority Data

Apr. 22, 2013 (DE) .......................... 10 2013 207 187

(51) Int. Cl.
*H02J 7/00* (2006.01)

(52) U.S. Cl.
CPC ................................... *H02J 7/0014* (2013.01)

(58) Field of Classification Search
CPC .......... H01M 10/4207; H01M 10/488; H01M 2010/4271; H01M 10/0445; H01M 10/122; H01M 10/482; H01M 10/0413; H02J 7/0021; H02J 7/0016; H02J 7/0022; H02J 7/008; H02J 7/0004; H02J 7/0008; H02J 7/163; H02J 7/0019; H02J 3/32; H02J 7/0026; H02J 7/007; Y02T 10/7005; Y02T 10/7016
USPC .................................................. 320/126–136
See application file for complete search history.

(56) References Cited

U.S. PATENT DOCUMENTS

| 8,896,315 | B1* | 11/2014 | Davies | H02J 7/0019 320/117 |
| 2001/0054877 | A1 | 12/2001 | Kinoshita | |
| 2012/0091966 | A1* | 4/2012 | Mori | H01M 10/44 320/134 |
| 2014/0306662 | A1* | 10/2014 | Kim | H02J 7/0016 320/118 |

FOREIGN PATENT DOCUMENTS

| DE | 103 05 638 A1 | 9/2003 |
| DE | 103 41 188 A1 | 4/2005 |
| DE | 10 2004 032 535 A1 | 2/2006 |
| DE | 10 2008 002 179 A1 | 12/2009 |

* cited by examiner

*Primary Examiner* — Binh Tat
(74) *Attorney, Agent, or Firm* — Maginot, Moore & Beck LLP

(57) ABSTRACT

A method for charge balancing of battery cells to be connected in parallel of a battery module includes making contact with terminals of the battery cells and measuring quiescent voltages of the battery cells; determining capacitances and internal resistances of the battery cells for determining a required duration for the charge balancing; and short-circuiting the battery cells in pairs at a low resistance and implementing the charge balancing via the internal resistances of the battery cells short-circuited in pairs. The method further includes ending the contact-making after the required duration; and producing a parallel circuit between the battery cells by fastening connecting lugs on respective terminals of the battery cells.

12 Claims, 2 Drawing Sheets

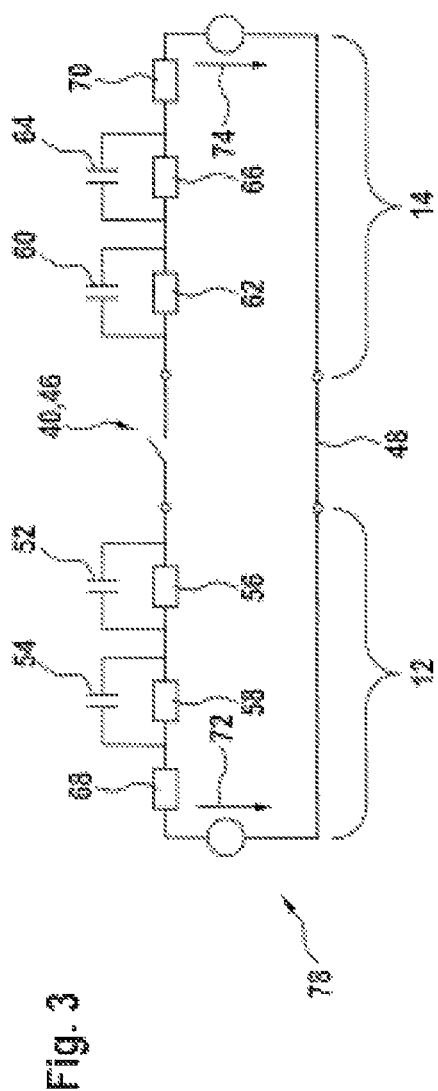
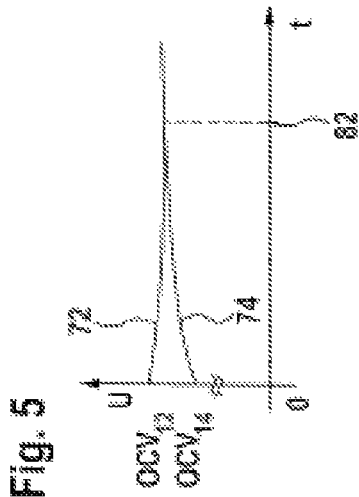
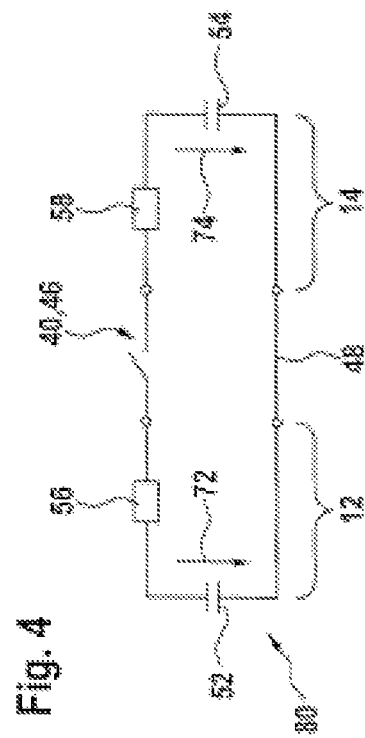

TIME-CONTROLLED CHARGE BALANCING IN BATTERY SYSTEMS

This application claims priority under 35 U.S.C. §119 to patent application no. DE 10 2013 207 187.6, filed on Apr. 22, 2013 in Germany, the disclosure of which is incorporated herein by reference in its entirety.

BACKGROUND

DE 10 2004 032 535 A1 relates to a battery pack. The battery pack comprises a plurality of rechargeable individual cells which are connected in parallel with one another. Provision is made for the individual cells to be designed or selected in such a way that their internal resistance $R_i$, increases as the state of charge decreases. In order to avoid complexity involved with wiring, monitoring and bringing individual unbalanced cells out of operation during the discharge and/or charge operations of cell strings connected in parallel with one another, lithium-ion cells with such individual cells whose internal resistance $R_i$ increases as the state of charge of the individual cell decreases, becomes minimal at a state of charge of approximately 80% and increases again as the state of charge increases and, with its trough-shaped characteristic, has a counteracting effect for a further divergence of the states of charge need to be included in a battery pack. With a connected limiting circuit, the battery pack is kept within a voltage range of between 7.5 V to 12.6 V, which is greater than the sum of the minimum operating voltage of series-connected individual cells.

DE 10 2008 002 179 A1 relates to an electrical energy store. Said electrical energy store contains a plurality of identical storage elements, wherein at least two strings of storage elements which are connected to one another in series are provided and the strings are connected in parallel. The parallel interconnection is present at a plurality of points along the strings, wherein each string has at least two storage elements and at least one active or passive component is used for connecting the strings in parallel with one another. Owing to the fact that a series circuit is generally insufficient for increasing the total capacitance and for improving the electricity supply capacity, but a parallel circuit of individual cells which is expedient in this regard results in a nonuniformity of the cell voltage between cells on the same plane which are in parallel with one another, the individual cells need to be balanced. Charge balancing either via a passive resistor or via a switchable field-effect transistor which can bridge at a low resistance or isolate at a high resistance is possible on any of these planes in accordance with DE 10 2008 002 179 A1. A time preset $t_L$ for the balancing of the scatter $\sigma(C)$ of the capacitance and the voltage difference $\Delta U_P$ of from 0.1 V to 0.5 V is, for a fixed resistance Li cell of 0.04 to 0.07Ω: $t_L = R^* \sigma(C)/\Delta U_P$. For balancing in 10 minutes, this resistance should be at 0.8Ω.

DE 10 305 638 A1 discloses a method and an apparatus for determining an off-load voltage of a battery. A measuring device in this case measures a connection voltage of the battery off-load in a specific cycle after termination of a charge or discharge operation of the battery, and a detection device detects the measured connection voltage. A calculation device calculates a voltage value to which an exponential approximation expression in the function profile asymptotically approximates as an assumed off-load voltage for the respective time period of the detected connection voltage, wherein the exponential approximation expression has an exponent of −0.5 or approximately −0.5 and is determined on the basis of the connection voltage of the respective time period of a plurality of predetermined time periods. The assumed off-load voltage of a time period in which the difference from the assumed off-load voltage of an adjoining time period becomes minimal is determined as an off-load voltage.

DE 10 341 188 A1 describes a battery arrangement for connection to an electrical load, which battery arrangement comprises a plurality of battery strings connected in parallel which are each constructed from a plurality of galvanic cells connected in series. In this case, a measuring unit for estimating the state of charge is assigned to each battery string, which measuring unit measures values for determining the state of charge of the battery string. An evaluation and control unit is connected to the measuring units for estimating the state of charge and evaluates the measured values. In addition, a plurality of switches are arranged in each case between one of the battery strings and the electrical load and in each case between one of the battery strings and the battery charger.

DE 10 2004 032 535 A1 describes a battery pack comprising a plurality of rechargeable individual cells which are connected in parallel with one another. The individual cells are in this case designed or selected in such a way that their internal resistance (Ri) increases as the state of charge (Lz) decreases. With a connected limiting circuit, in this case the battery pack is limited to a voltage range which is greater than the sum of the minimum operating voltages of the individual cells connected in series.

During manufacture of arrangements which have a parallel circuit of battery cells, the following technical problem arises: if the battery cells have states of charge which deviate slightly from one another, when the cell connectors are applied, generally in the form of flat connecting lugs consisting of a copper or aluminum material, very high balancing currents flow. The flow of these balancing currents relates both to screw-type and cohesive connections. The reason for this is that different electromotive forces of the battery cells are discharged via their very low internal resistances. Mention will be made by way of example for a lithium-ion battery cell of the fact that a 60 Ah battery cell in the region of average states of charge at room temperature for short-term pulse loading has an internal resistance of the order of magnitude of 300 μΩ. If the battery cells at the time of manufacture of the battery have a difference in the state of charge of ±2.5%, this results in differences in the voltage in the region of up to 150 mV. If the cell connectors for producing a parallel connection in the case of two adjoining cells are fitted, balancing currents of the order of magnitude of 250 A result. This can lead to considerable sparking at the connection terminals during manufacture, inter alia, which should be avoided during the manufacturing process for safety reasons.

SUMMARY

The disclosure proposes a method for charge balancing of battery cells to be connected in parallel, wherein first contact-making with the battery cell is performed at their terminals and measurement of quiescent voltages of the battery cells is performed. Then, capacitances and internal resistances of the battery cells are determined, from which a determination of a required duration for the implementation of charge balancing is performed. Then, pairwise, low-resistance short-circuiting of the battery cells is performed, with the result that charge balancing via the internal resistances of the battery cells which are short-circuited in pairs can take place. Once the required duration for the charge balancing has elapsed, the contact-making is ended. After ending of the contact-making, the production of a parallel circuit between battery cells is performed by fastening connecting lugs onto the respective terminals of the individual battery cells, which can then be combined to form a battery module.

Preferably, the production of a parallel circuit between the individual battery cells is performed at the respective terminals in such a way that the battery cells are interconnected with a 3S2P configuration. 3S2P configuration means that three battery cells are connected in series and two groups of battery cells are each connected in parallel. Preferably, the battery cells are positioned mechanically with respect to one another in a suitable manufacturing apparatus prior to the method for charge balancing being performed. During implementation of all of the method steps, the individual battery cells in the process remain correspondingly fixed and therefore form semifinished modules, in which the position of the battery cells for the battery module to be produced is already fixed. As a result, it is no longer possible for there to be any confusion at a later point in time when relocating the battery cells without any additional complexity being involved.

The determination of the required duration for implementing the charge balancing process is determined from parameters such as voltages of the battery cells, internal resistances of the battery cells and capacitances of the battery cells. The determination of the required duration is performed with the aid of a physical model, with which the temporal sequence of the charge balancing can be described. Further details in this regard can be gleaned from the description relating to FIG. 3. Should it arise that only small differences in the state of charge occur in the case of battery cells to be connected in parallel, a simplified determination of the required duration for implementing the charge balancing can be performed. Within the scope of this simplification, the balancing operation can in particular be modeled as discharging of a capacitor of one of the battery cells and charging, associated therewith, of a capacitor of a respective other battery cell to be connected in parallel via the respective internal resistances of the battery cells. By means of this model, the balancing operation can be mapped by a first-order differential equation which can be reduced to a first-order exponential function. In this exponential function, the time constant is a function of electrical parameters, such as, for example, the resistance, the inductance and the capacitance. Via these parameters, the required duration for reducing the quiescent voltages of the two battery cells to be connected to one another to below a predetermined limit value which is of the order of magnitude of 2 mV, for example, can be determined easily.

In accordance with the method proposed according to the disclosure, low-resistance short-circuiting of in each case two battery cells connected via a switch is performed. The switch is preferably in the form of a relay or a contactor. The contact-making operation between the individual battery cells with current flow does not take place directly at the battery cell, but in encapsulated form in the manufacturing device of the battery cell. The balancing operation is performed in the form of a charge exchange with a very low resistance and via the resistors of the battery cells. Once the required duration for the balancing operation in accordance with the abovementioned relationships has elapsed, the contact-making of the battery cells for implementing the balancing operation is ended.

Within the manufacturing apparatus in which the individual battery cells to be connected in parallel with one another are accommodated, said battery cells remain with a mechanical assignment with respect to one another during the implementation of all of the method steps of the method proposed according to the disclosure. The formation of the parallel circuit comprising the individual battery cells is performed after ending of the contact-making by applying cell connectors in the form of connecting lugs, which are manufactured from aluminum (Al), copper (Cu) or an aluminum-copper alloy, for example. The lug-shaped cell connectors can be produced by way of screwing or by connecting in a cohesive manner, such as welding or laser welding, for example. In order to exclude the possibility of confusion, the battery cells remain fixed in the in each case semifinished modules, with the result that additional complexity can be avoided.

In a further configuration of the method proposed in accordance with the disclosure, which will be described in more detail below for two battery cells to be connected to one another, a parallel circuit comprising more than two battery cells can be implemented substantially in the same way. For the case where a limitation of the balancing current flowing during the balancing operation should be necessary, the balancing operation, as part of the above method, can be influenced via an additionally introduced ohmic resistor. This resistor can be introduced both in series with the switch and in a low-resistance connection between two battery poles.

The physical model for describing the charge balancing operation can be matched in a simple manner by virtue of the series circuit comprising the internal resistances and the additionally introduced ohmic resistor being considered as the model instead of the internal resistances of the individual battery cells.

The solution proposed in accordance with the disclosure provides a method which can be used for achieving charge balancing of battery cells to be connected in parallel. In comparison with previous methods, the method proposed according to the disclosure is characterized by the fact that no sparking occurs in the parallel interconnection in the vicinity of the cell terminal when the charge balancing is performed. It should furthermore be noted that the charge balancing between the individual battery cells is implemented very quickly, with the result that the method can be used in a favorable manner in mass production.

Since the battery cells which are fixed mechanically in relation to one another remain within the manufacturing apparatus to a certain extent as a semifinished product, i.e. semifinished battery modules, confusion of the battery cells after implementation of the charge balancing before the parallel circuit is finished is safely ruled out.

BRIEF DESCRIPTION OF THE DRAWINGS

The disclosure will be described in more detail below with reference to the drawings, in which:

FIG. 3 shows the exemplary illustration of a physical model for describing the sequence of charge balancing in the case of a low-resistance electrical connection between two battery cells, and FIG. 4 shows a simplified physical model for describing the sequence of charge balancing in the case of a low-resistance electrical connection between two battery cells with only slight differences in the states of charge, FIG. 5 shows a profile of the voltage in the open circuit for two battery cells selected by way of example.

DETAILED DESCRIPTION

Figure 1:
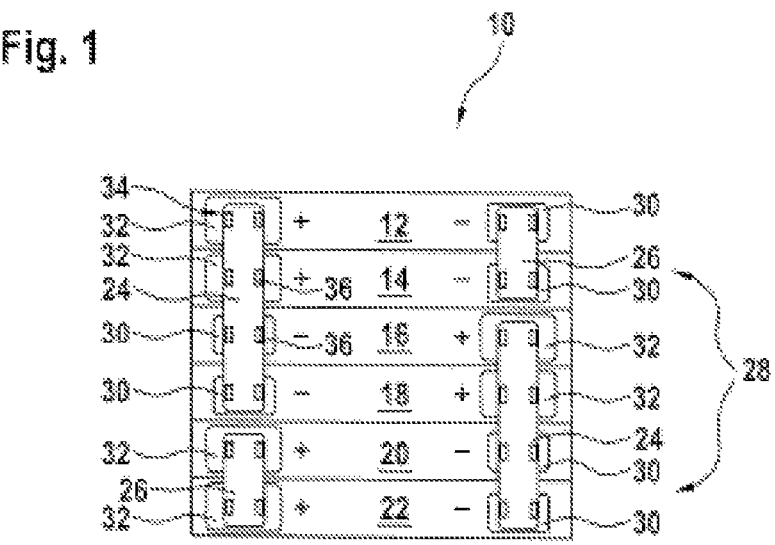
FIG. 1 shows a battery module comprising 6 battery cells, whose terminals are connected electrically to one another with a 3S2P circuit configuration via connecting lugs.

FIG. 1 shows an electrical connection of battery cells of a battery module.

The illustration shown in FIG. 1 shows battery module 10, which comprises a number of battery cells 12, 14, 16, 18, 20, 22. The individual battery cells 12, 14, 16, 18, 20, 22 each have negative terminals 30 and positive terminals 32. The battery module 10 in accordance with the illustration in FIG. 1 is interconnected with a 3S2P configuration 28 (three battery cells connected in series, two groups of battery cells connected in parallel). In order to interconnect the individual battery cells 12, 14, 16, 18, 20, 22 of the battery module 10 in accordance with the illustration shown in FIG. 1, connecting lugs 24, 26 are provided. The connecting lugs 24, 26 have different lengths and can be manufactured from copper, aluminum or from a copper-aluminum alloy.

The connecting lugs 24, 26 are connected to the terminals 30, 32 in accordance with the 3S2P configuration 28 as illustrated in FIG. 1. The fastening can be performed by a cohesive connection 34, such as a welded joint 36. However, there is also the possibility of joining the terminals 30, 32 using the connecting lugs 24, 26 via a screw-type connection.

Figure 2:
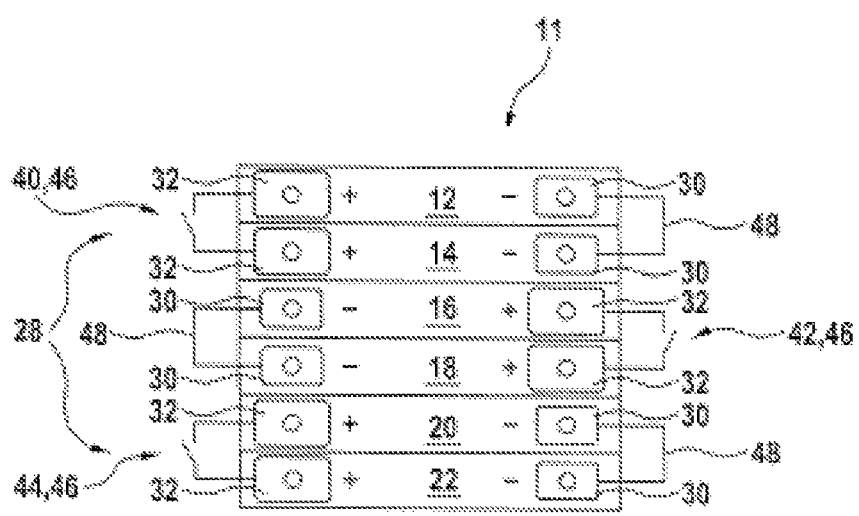
FIG. 2 shows a battery module, in which battery cells are illustrated in pairs via switched short circuits for a 3S2P configuration.

FIG. 2 shows an arrangement proposed according to the disclosure of battery cells for charge balancing of different states of charge by performing switched short circuits.

FIG. 2 shows that in an apparatus not illustrated in any more detail, six battery cells, namely a first battery cell 12, a second battery cell 14, a third battery cell 16, a fourth battery cell 18, a fifth battery cell 20 and a sixth battery cell 22 are fixed in relation to one another. In the illustration shown in FIG. 2, the individual battery cells 12, 14, 16, 18, 20, 22 are positioned in relation to one another; this is a semifinished battery module 11 since the connection between the individual negative terminals 30 or positive terminals 32 is not implemented. The battery cells 12, 14, 16, 18, 20, 22 are held in the position illustrated in FIG. 2 by a manufacturing apparatus (not illustrated in any more detail), which fixes the individual battery cells 12, 14, 16, 18, 20, 22 in relation to one another and therefore encapsulates them from the surrounding environment.

As can be seen from FIG. 2, contact is made with the individual battery cells 12, 14, 16, 18, 20, 22 at their terminals 30 or 32. As can be seen from the illustration shown in FIG. 2, the first battery cell 12 and the second battery cell 14 are short-circuited at the negative terminals 30 via an electrical connection 48 and, on the opposite side of the two battery cells 12, 14, a first switch 40 is arranged which is open in the illustration shown in FIG. 2. Similarly, the third battery cell 16 and the fourth battery cell 18 are connected to one another at the negative terminals 30 by the connection 48, while the positive terminals 32 of the third battery cell 16 and the fourth battery cell 18 can be short-circuited by a second switch 42, which is in the open position in the embodiment illustrated. Similarly, the fifth battery cell 20 and the sixth battery cell 22 are electrically connected to one another at their negative terminals 30 by the connection 48, while the two positive terminals 32 of the fifth battery cell 20 and the sixth battery cell 22 can be short-circuited by a third switch 44, which is in an open position in the illustration shown in FIG. 2.

First, a measurement of the quiescent voltage of the battery cells 12, 14, 16, 18, 20, 22 to be connected in parallel is performed. Optionally, the manufacturing data of the battery cells 12, 14, 16, 18, 20, 22 can be used to obtain further information, such as, for example, the quiescent voltage of the respective battery cell 12, 14, 16, 18, 20, 22, the capacitance of the respective battery cell 12, 14, 16, 18, 20, 22. Further information can to this extent specify how high the respective internal resistances of the battery cells 12, 14, 16, 18, 20, 22 are.

From this information on the battery cells 12, 14, 16, 18, 20, 22, in accordance with the method proposed according to the disclosure, a required duration for the charge balancing of the battery cells 12, 14, 16, 18, 20, 22 is determined. The determination of the required duration for the charge balancing can be performed in two different ways.

FIG. 3 shows a physical model of lithium-ion battery cells, with which the time sequence of the charge balancing can be described. FIG. 3 shows that the first battery cell 12 and the second battery cell 14 can be configured in a simplified manner in such a way that a first internal resistance 56, $R_{i,1}$ and a second internal resistance 58, $R_{i,2}$, in each case a first capacitance 52 and a second capacitance 54 are connected in parallel in relation to the first battery cell 12 and the second battery cell 14 in the equivalent circuit diagram 78. The two internal resistances $R_{i,1}$, $R_{i,2}$ 56, 58 are in series with a first balancing resistor 68.

Similarly, the second battery cell 14 in the equivalent circuit diagram 78 shown in the illustration in FIG. 3 can be mapped by virtue of the fact that in each case a third capacitance 60 and a fourth capacitance 64 are connected in parallel with a third internal resistance 62 and a fourth internal resistance 66, $R_{i,3}$ and $R_{i,4}$, respectively.

The two battery cells 12, 14 shown in the illustration in FIG. 3 are connected to one another via the electrical connection 48, cf. FIG. 2, while the first switch 40, via which a switched short circuit 46 can be produced, is open in the illustration shown in FIG. 3, analogously to the illustration shown in FIG. 2.

FIG. 4 shows a further equivalent circuit diagram of two battery cells to be connected to one another for the case where there are only small deviations in the states of charge.

The illustration shown in FIG. 4 represents a simplification of the equivalent circuit diagram 78 illustrated in FIG. 3. FIG. 4 shows that the first battery cell 12 can be mapped by the first internal resistance 56 $R_{i,1}$ and the first capacitance 52 connected in series therewith. The charge balancing in this case corresponds to that shown in FIG. 5. Item 72 denotes the OCV value $OCV_{12}$ of the first battery cell 12, while the second battery cell 14 in the illustration in FIG. 4 is represented by the series-connected internal resistance $R_{i,2}$ 58 and the second capacitance 54. The corresponding OCV value $OCV_{14}$ is indicated by reference symbol 74 in FIG. 5. The two battery cells 12, 14 are connected to one another by the electrical connection 48 on one side and by the first switch 40, which in this case is in the open position. A switched short circuit 46 can be produced via the first switch 40.

The duration over which a charge balancing between battery cells 12, 14, 16, 18, 20, 22 which are to be connected in parallel with one another is set is dependent on the level of the charge differences, wherein the required duration can be calculated either in accordance with the equivalent circuit diagram 78 shown in FIG. 3 or, in the case of small charge differences, in accordance with the equivalent circuit diagram 80 shown in FIG. 4.

In accordance with the method proposed according to the disclosure, the procedure for balancing of charge differences is as follows:

The individual battery cells 12, 14, 16, 18, 20 and 22 of the semifinished battery module 11 in accordance with the illustration in FIG. 2 are mechanically fixed. Then, contact is made with the battery cells 12, 14, 16, 18, 20 and 22 at their respective terminals 30, 32. The contact-making apparatus is integrated in a manufacturing device for producing battery modules 10. First, a measurement of the quiescent voltage of the battery cells 12, 14, 16, 18, 20 and 22 to be connected in parallel is performed. In addition, the manufacturing data of the battery cells 12, 14, 16, 18, 20 and 22, in particular the quiescent voltage which can be measured during the final inspection of the battery cells 12, 14, 16, 18, 20 and 22, for example, is used. Furthermore, information on the capacitances and the internal resistances of the respective battery cells 12, 14, 16, 18, 20 and 22 is provided.

Since, in the semifinished battery module 11 illustrated in FIG. 2, six battery cells 12, 14, 16, 18, 20 and 22 are interconnected by means of a 3S2P configuration 28, in each case two battery cells 12, 14 and 16, 18 and 20, 22 are short-circuited at a low resistance via the switches 40, 42, 44. These switches 40, 42, 44 are preferably relays or contactors. The switching operation or the contact-making of the terminals 30, 32 with a set current flow does not take place directly at the respective pairs of battery cells 12, 14 and 16, 18 and 20, 22, but in encapsulated form in the manufacturing apparatus for producing the finished battery module 10. The balancing operation is performed in the form of charge exchange, which takes place at a low resistance via the two internal resistances of the battery cells 12, 14 (cf. equivalent circuit diagram shown in FIG. 3 internal resistances 56, 58 $R_{i,1}$, $R_{i,2}$, position 56, 58 of the first battery cell 12 or the internal resistances 62, 66 $R_{i,3}$, $R_{i,4}$ of the second battery cell). Contact is made with the battery cells 12, 14 and 16, 18 and 20, 22 during the required time spans determined on the basis of the physical model in accordance with FIGS. 3 and 4 depending on the state of the charge of the battery cells 12, 14, 16, 18, 20 and 22 to be connected in parallel with one another.

The simplified determination of the required duration (cf. FIG. 4) is performed on the basis of a first-order differential equation which can be reduced to a first-order exponential function. In said function, the time constant results as a function of the electrical parameters, such as resistance, inductance and capacitance, for example.

In connection with the equivalent circuit diagram 80 illustrated in FIG. 4, mention will be made of the fact that the balancing operation can in this case, i.e. for the case of small deviations in the states of charge of the battery cells 12, 14 to be connected to one another, be operated for a cell as discharge of a first capacitance 52 or of a first capacitor and for a second battery cell 14 associated therewith as charge operation of a second capacitance 54, which is likewise in the form of a capacitor. With this simple model, the balancing operation can be described by a first-order differential equation. The required duration for reducing the quiescent voltages of the two battery cells, in this case of the first battery cell 12 and the second battery cell 14, to below a predetermined limit value, for example 2 mV, can be determined very easily via a first-order differential equation, which leads to a first-order exponential function, wherein the time constant of said function is provided by a function of electrical parameters such as, for example, the resistance, the inductance and the capacitance.

After the charge balancing between the two battery cells 12 and 14 or 16 and 18 or 20 and 22 which are to be connected in parallel with one another, which charge balancing is performed at a very low resistance via the two internal resistances 56 or 58 in relation to the first battery cell 12 and 62 or 66 in relation to the second battery cell 14, the contact-making with the two battery cells 12, 14 is ended once the duration determined in accordance with the equivalent circuit diagram shown in FIG. 3 or in accordance with the equivalent circuit diagram shown in FIG. 4 has elapsed.

FIG. 5 shows the profile of the voltage in the open circuit for two battery cells selected by way of example.

The reference symbol 72 denotes the profile of the OCV value $OCV_{12}$ (OCV=Open Circuit Voltage) of the first battery cell 12 in FIG. 5. Item 74 denotes an OCV value $OCV_{14}$ of the second battery cell 14 analogously to the OCV value $OCV_{12}$ of the first battery cell 12, whose profile is denoted by the reference symbol 74 in FIG. 5. FIG. 5 shows how the two voltages $OCV_{12}$ and $OCV_{14}$ converge with one another after a duration 82 and therefore the charge balancing between the two battery cells 12, 14 has been performed.

Then, the parallel circuit comprising the battery cells 12, 14, 16, 18, 20, 22 is performed via fastening connecting lugs 24, 26, as a result of which the finished battery module 10 is produced (see illustration shown in FIG. 1). The individual connecting lugs 24, 26 can be connected cohesively to the terminals 30, 32 of the battery cells 12, 14, 16, 18, 20 and 22 of the semifinished battery module 11, for example by means of implementing laser welding, or it is possible for the terminals 30, 32 of the battery cells 12, 14, 16, 18, 20 and 22 to be screwed to the connecting lugs 24, 26, for example, and to represent a 3S2P parallel interconnection 28 in this way.

The individual battery cells 12, 14, 16, 18, 20 and 22 remain in the already semifinished battery module 11 during the parallel interconnection, cf. illustration shown in FIG. 2, as a result of which confusion can be ruled out without any additional complexity being involved.

The procedure illustrated for a parallel circuit comprising two battery cells 12 and 14 or 16 and 18 or 20 and 22 for determining a duration for the charge balancing in accordance with the equivalent circuit diagrams shown in FIG. 3 or 4 and the implementation of the corresponding charge balancing can also be implemented for a parallel circuit comprising more than two battery cells in the same way.

If a limitation of the balancing current is required, which, as illustrated above, can be of the order of magnitude of 200 A or more, the balancing current can be limited in a desirable manner via an additionally introduced ohmic resistor (cf. balancing resistors 68, 70 in the equivalent circuit diagram 78 shown in FIG. 3). The balancing resistor 68, 70 in the equivalent circuit diagram 78 shown in FIG. 3 can be introduced both in series with the corresponding switches 40, 42, 44 and in the low-resistance connection 48 between two negative terminals 30 of the battery cells 12, 14, 16, 18, 20, 22. The physical model for the description of the balancing operation can be matched in a very simple manner in such a way that, instead of the internal resistances 52, 54 of the two battery cells 12, 14, a series circuit comprising internal resistances 52, 54 of the battery cells 12, 14 and the additionally introduced ohmic resistors 56, 58 is used as a model (cf. FIG. 4).

By virtue of the procedure proposed in accordance with the disclosure, a method is proposed for charge balancing of battery cells 12, 14, 16, 18, 20 and 22 to be connected in parallel, which method avoids sparking during the parallel interconnection in the vicinity of the negative terminals 30 and the positive terminals 32 of the battery cells 12, 14, 16, 18, 20 and 22 to be connected to one another. The charge balancing between the individual battery cells 12, 14, 16, 18, 20 and 22 is performed very quickly and is performed in a manner to match the specific situation of the battery cells 12, 14, 16, 18, 20 and 22 to be connected to one another in parallel via time control. Confusion of the battery cells 12, 14, 16, 18, 20 and 22 at which the charge balancing has previously taken place is ruled out after charge balancing up to completion of the parallel interconnection, since the battery cells 12, 14, 16, 18, 20 and 22 remain in one and the same position in the corresponding manufacturing apparatus for battery modules 10 during the charge balancing and the subsequent parallel interconnection, and no relocation is performed which could result in a risk of confusion.

What is claimed is:

1. A method of manufacturing a battery module having a plurality of battery cells, the plurality of battery cell including at least one group of battery cells to be connected in parallel, comprising:
   a) before the battery cells are permanently interconnected, making temporary contact with terminals of the battery cells;
   b) during the temporary contact, measuring quiescent voltages, capacitances and internal resistances of the battery cells;
   c) during the temporary contact, determining a required duration for the charge balancing based on the measured quiescent voltages, capacitances, and internal resistances;
   d) during the temporary contact, implementing a charge balancing by short-circuiting the battery cells of each of the at least one groups of battery cells to be connected in parallel;
   e) ending the temporary contact and the short-circuiting after the charge balancing has been implemented for the required duration; and
   f) after the charge balancing, producing a permanent parallel interconnection of each of the at least one group of battery cells to be connected in parallel by fastening connecting lugs on respective terminals of the battery cells.

2. The method according to claim 1, further comprising:
   after the charge balancing, producing a permanent interconnection of the battery cells in a 3S2P configuration.

3. The method according to claim 1, wherein the battery cells are fixed mechanically to one another prior to implementing method steps a) to f) and remain mechanically fixed to one another during implementation of the method.

4. The method according to claim 1, wherein, in accordance with the method step c), the required duration of the charge balancing is calculated from the quiescent voltages, the internal resistances, and the capacitances of the battery cells in accordance with a physical model.

5. The method according to claim 1, wherein, in accordance with method step c), the required duration of the charge balancing is determined from the quiescent voltages, the internal resistances, and the capacitances of the battery cells in accordance with a first-order differential equation in a simplified manner which can be reduced to a first-order exponential function whose time constant is provided by a functional relationship between electrical parameters.

6. The method according to claim 1, wherein, in response to small charge differences between the battery cells, the charge balancing is approximated by discharging a first capacitance of a first battery cell and charging a second capacitance of a second battery cell via the internal resistances of the battery cells.

7. The method according to claim 1, wherein:
   the short-circuiting of two battery cells is performed by switches, and
   the switches include relays or contactors.

8. The method according to claim 1, wherein the short-circuiting is performed in encapsulated form within a manufacturing apparatus configured to fix the battery cells in relation to one another.

9. The method according to claim 1, wherein the permanent parallel interconnection of the battery cells is produced by attaching connecting lugs and connecting said connecting lugs to the terminals.

10. The method according to claim 1, wherein, during steps a) to e), the battery cells remain within a partially manufactured battery module.

11. The method according to claim 7, wherein a balancing current is limited during the charge balancing of battery cells by a resistor.

12. The method according to claim 11, wherein the resistor is implemented both in series with the switches and in a low-resistance connection between negative terminals of two battery cells.

* * * * *